No. 831,929. PATENTED SEPT. 25, 1906.
C. CHRISTIANSON.
TRAP.
APPLICATION FILED MAR. 31, 1906.

WITNESSES:
Louis R. Heinrichs
P. M. Smith

INVENTOR
Christian Christianson,
BY Victor J. Evans
Attorney

UNITED STATES PATENT OFFICE.

CHRISTIAN CHRISTIANSON, OF BOWBELLS, NORTH DAKOTA.

TRAP.

No. 831,929.     Specification of Letters Patent.     Patented Sept. 25, 1906.

Application filed March 31, 1906. Serial No. 309,185.

*To all whom it may concern:*

Be it known that I, CHRISTIAN CHRISTIANSON, a citizen of the United States, residing at Bowbells, in the county of Ward and State of North Dakota, have invented new and useful Improvements in Traps, of which the following is a specification.

This invention relates to animal-traps, the object of the invention being to provide a simple, cheaply manufactured and effective animal-trap for gripping the leg or legs of an animal and securely holding the same, the trap embodying simple and novel mechanism for holding and releasing and throwing or closing the jaws when the animal steps thereon.

With the above general object in view the invention consists in the novel construction, combination, and arrangement of parts, hereinafter more fully described, illustrated, and claimed.

Figure 1:
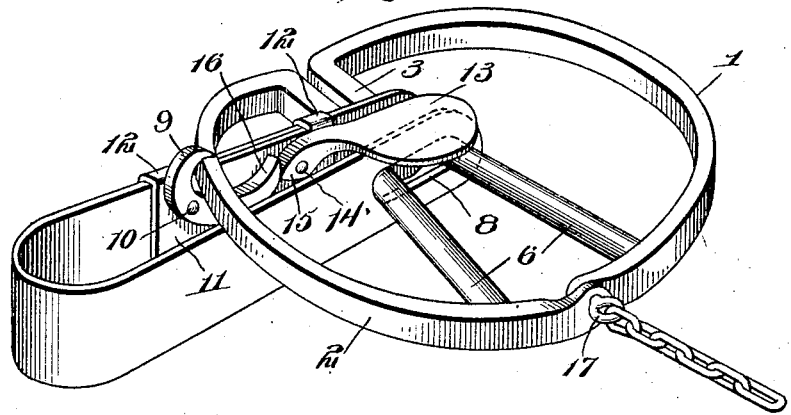
Figure 2:
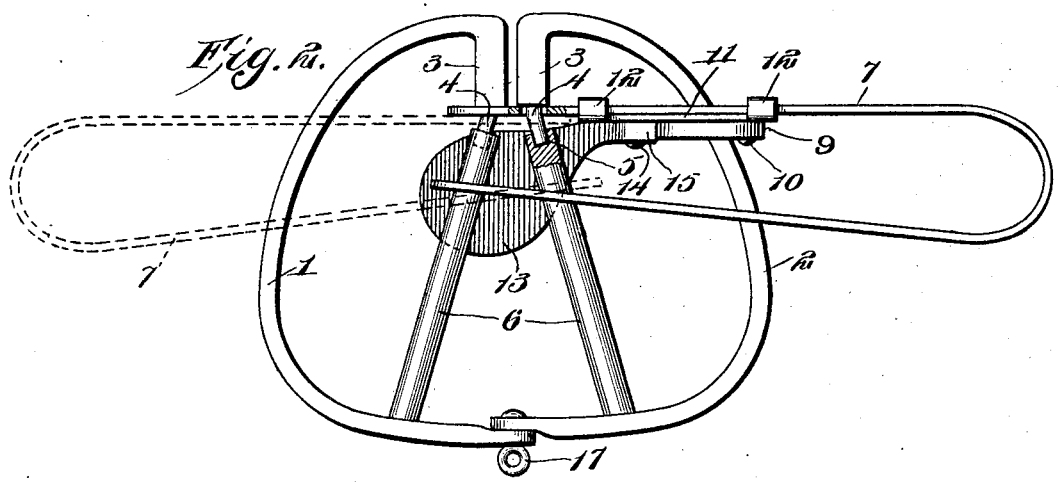
Figure 3:
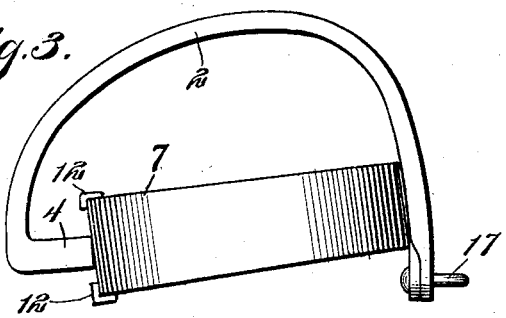

In the accompanying drawings, Figure 1 is a perspective view of an animal-trap embodying the present invention, the trap being shown set. Fig. 2 is a bottom plan view of the same, partly broken away in section. Fig. 3 is a side view of the trap after the same has been sprung.

Referring to the drawings, 1 and 2 designate a pair of arcuate and substantially semicircular jaws, each of said jaws being preferably formed of a single bar bent into semicircular form and having one extremity thereof bent inward, as shown at 3, to project radially, said inbent extremity 3 being provided with a reduced projecting stud 4, which is received in a corresponding socket 5 in the adjacent and abutting extremity of one of a pair of diverging and inclining bars 6, which extend from the inbent ends 3 toward the opposite side of the jaws 1 and 2, being connected at said opposite extremities to the jaws in any convenient manner.

It will be observed that the bars 6 not only diverge, but they are also inclined, as best shown in Fig. 3, so as to enable the actuating-spring to have the necessary closing effect on the jaws.

The jaw-closing spring comprises a flat body portion 7, which is provided with openings to receive the studs 4, the said body part of the spring fitting up against the shoulders formed by reducing the inbent ends 3 to provide studs 4, as clearly shown in Fig. 2. The spring is bent into U shape, as shown in Figs. 1 and 2, and the free end thereof is provided with an elongated slot 8, which receives the diverging bars 6, the arrangement being such that when the free end of the spring is liberated and allowed to fly outward away from the body portion 7 it acts upon the diverging bars 6, drawing the outer ends thereof toward each other and quickly closing the jaws of the trap upon the leg or legs of the animal.

In order to hold the jaws open, I provide a catch 9, having a hook-shaped extremity adapted to engage over one of the jaws, as shown in Fig. 1, said catch being pivotally mounted at 10 on a carrier or slide 11, which rests against the inner side of the body 7 of the spring and is provided with bent retaining-lips 12, which embrace the top and bottom edges of the body of the spring and prevent the slide or carrier from slipping off the spring, but enabling said slide to be moved lengthwise of the body 7 of the spring in order to bring the hook of the catch into engagement with the adjacent jaw 2 of the trap. The carrier or slide 11 also has mounted thereon a combined bait-table and trigger 13, the same being fulcrumed at 14 on the slide 11 and having its nose 15 in engagement with the tail 16 of the catch 9, whereby when the animal places any weight upon said table 13 it will rock the catch 9 and throw the same out of engagement with the adjacent jaw of the trap, thereby releasing said jaw and allowing the spring to throw both of the jaws upward and together. The other ends of the jaws are connected by an eyebolt 17, which forms the pivotal connection between the jaws at one side thereof, while the pivotal connection at the opposite side is afforded by the studs 4, which pass through the body 7 of the spring.

I claim—

1. An animal-trap comprising oppositely-arranged swinging jaws provided with angularly-disposed bars, and a jaw-throwing spring having its free end in engagement with said angularly-disposed bars.

2. An animal-trap comprising oppositely-arranged swinging jaws pivotally related to each other and provided with diverging and inclining bars, and a jaw-throwing spring having the free end thereof in sliding engagement with said bars.

3. An animal-trap comprising pivotally-connected jaws provided with diverging bars, in combination with a spring having one end connected to the jaws and the opposite free end working in sliding engagement with said diverging bars and coöperating therewith to close the jaws.

4. An animal-trap comprising oppositely-arranged jaws, a jaw-closing spring having the free end thereof in operative engagement with the jaws and adapted to close the latter, a carrier having a sliding engagement with said spring, and a tripping mechanism mounted on said carrier.

5. An animal-trap comprising oppositely-arranged pivotally-connected jaws, in combination with a jaw-closing spring extending substantially at right angles to the axis of movement of the jaws, a sliding carrier movable on a part of the spring, a jaw-engaging catch on said carrier, and a trigger on said carrier coöperating with the catch.

In testimony whereof I affix my signature in presence of two witnesses.

CHRISTIAN CHRISTIANSON.

Witnesses:
F. I. LYON,
RASMUS HANSEN.